United States Patent
Sonnier et al.

(10) Patent No.: US 6,631,131 B1
(45) Date of Patent: Oct. 7, 2003

(54) TRANSPOSE TABLE BIASED ARBITRATION SCHEME

(75) Inventors: David P. Sonnier, Austin, TX (US);
William J. Watson, Austin, TX (US);
Robert B. Mizell, Austin, TX (US);
Robert W. Horst, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/312,923

(22) Filed: May 17, 1999

Related U.S. Application Data

(63) Continuation-in-part of application No. 09/073,401, filed on May 13, 1998, now Pat. No. 6,424,655.

(51) Int. Cl.$^7$ .............................................. H04L 12/56
(52) U.S. Cl. ...................................... 370/357; 370/467
(58) Field of Search ................................ 370/357, 369, 370/380, 381, 371, 370, 412, 467

(56) References Cited

U.S. PATENT DOCUMENTS

| | | | | |
|---|---|---|---|---|
| 4,389,642 A | * | 6/1983 | Kahn ........................... 340/2.2 |
| 4,852,083 A | * | 7/1989 | Niehaus et al. ............ 340/2.28 |
| 5,694,121 A | * | 12/1997 | Krause et al. ........... 340/825.5 |
| 5,710,549 A | * | 1/1998 | Horst et al. .............. 340/825.5 |
| 6,081,527 A | * | 6/2000 | Chappel et al. ............. 370/394 |

* cited by examiner

Primary Examiner—Chau Nguyen
Assistant Examiner—Nhat Do
(74) Attorney, Agent, or Firm—Oppenheimer Wolff & Donnelly; Leah Sherry

(57) ABSTRACT

A biased arbitration technique utilizes a transpose table to arbitrate access to a shared resource. Each column of transpose table is a binary bias vector encoding a bias value assigned to one of the requestors. The rows of the table are fetched to assure that requestors having high bias values are granted more frequent access to the shared resource. A look-ahead feature skips rows having all zeros and an unbiased cycle that assures all requesting ports are serviced regardless of their bias values.

18 Claims, 12 Drawing Sheets

FIG. 5.

|  |  | PORT | | | | | | | | | | | |
|---|---|---|---|---|---|---|---|---|---|---|---|---|---|
| ROW# | | 0 | 1 | 2 | 3 | 4 | 5 | 6 | 7 | 8 | 9 | 10 | 11 |
| 0 | $2^8$ | 0 | 0 | 0 | 0 | 0 | 0 | 0 | 0 | 0 | 0 | 0 | 0 |
| 1 | $2^7$ | 0 | 0 | 0 | 0 | 0 | 0 | 0 | 0 | 0 | 0 | 0 | 0 |
| 2 | $2^6$ | 0 | 0 | 0 | 0 | 0 | 0 | 0 | 0 | 0 | 0 | 0 | 0 |
| 3 | $2^5$ | 0 | 0 | 0 | 0 | 0 | 0 | 0 | 0 | 0 | 0 | 0 | 0 |
| 4 | $2^4$ | 0 | 0 | 0 | 0 | 0 | 0 | 0 | 0 | 0 | 0 | 0 | 0 |
| 5 | $2^3$ | 0 | 1 | 1 | 0 | 0 | 0 | 0 | 0 | 0 | 0 | 0 | 0 |
| 6 | $2^2$ | 0 | 0 | 0 | 0 | 0 | 0 | 0 | 0 | 0 | 0 | 0 | 0 |
| 7 | $2^1$ | 0 | 1 | 1 | 0 | 1 | 0 | 0 | 0 | 0 | 0 | 0 | 0 |
| 8 | $2^0$ | 1 | 0 | 0 | 1 | 1 | 1 | 1 | 1 | 1 | 1 | 1 | 1 |

FIG. 6.

| CTR | | | | | | | | | | ROW | ACCESSED |
|---|---|---|---|---|---|---|---|---|---|---|---|
| 8 | 7 | 6 | 5 | 4 | 3 | 2 | 1 | 0 | | | |
| x | x | x | x | x | x | x | x | 0 | | 0 | $2^8$ |
| x | x | x | x | x | x | x | 0 | 1 | | 1 | $2^7$ |
| x | x | x | x | x | x | 0 | 1 | 1 | | 2 | $2^6$ |
| x | x | x | x | x | 0 | 1 | 1 | 1 | | 3 | $2^5$ |
| x | x | x | x | 0 | 1 | 1 | 1 | 1 | | 4 | $2^4$ |
| x | x | x | 0 | 1 | 1 | 1 | 1 | 1 | | 5 | $2^3$ |
| x | x | 0 | 1 | 1 | 1 | 1 | 1 | 1 | | 6 | $2^2$ |
| x | 0 | 1 | 1 | 1 | 1 | 1 | 1 | 1 | | 7 | $2^1$ |
| 0 | 1 | 1 | 1 | 1 | 1 | 1 | 1 | 1 | | 8 | $2^0$ |
| 1 | 1 | 1 | 1 | 1 | 1 | 1 | 1 | 1 | | (None) | |

REQMATRIX: /300

| | ROW | PORT 0 | 1 | 2 | 3 | 4 | 5 | 6 | 7 | 8 | 9 | 10 | 11 | LSREQS |
|---|---|---|---|---|---|---|---|---|---|---|---|---|---|---|
| MSB | 0 | 0 | 0 | 0 | 0 | 0 | 0 | 0 | 0 | 0 | 0 | 0 | 0 | 0 |
| | 1 | 0 | 0 | 0 | 0 | 0 | 0 | 0 | 0 | 0 | 0 | 0 | 0 | 0 |
| | 2 | 0 | 0 | 0 | 0 | 0 | 0 | 0 | 0 | 0 | 0 | 0 | 0 | 0 |
| | 3 | 0 | 0 | 0 | 0 | 0 | 0 | 0 | 0 | 0 | 0 | 0 | 0 | 0 |
| | 4 | 0 | 0 | 0 | 0 | 1 | 1 | 0 | 0 | 0 | 0 | 0 | 0 | 1 |
| | 5 | 0 | 1 | 0 | 0 | 0 | 0 | 0 | 0 | 0 | 0 | 0 | 0 | 1 |
| | 6 | 1 | 0 | 0 | 0 | 0 | 1 | 0 | 0 | 0 | 0 | 0 | 0 | 1 |
| | 7 | 0 | 0 | 0 | 0 | 0 | 0 | 0 | 0 | 0 | 0 | 0 | 0 | 1 |
| LSB | 8 | 1 | 0 | 1 | 0 | 0 | 0 | 0 | 0 | 0 | 0 | 0 | 1 | 1 |
| REQ VECTOR | | 1 | 1 | 1 | 0 | 1 | 1 | 0 | 0 | 0 | 0 | 1 | 1 | |
| REQUESTED WINS | | 5 | 8 | 1 | 0 | 16 | 20 | 0 | 0 | 0 | 0 | 0 | 1 | |

*FIG. 7.*

| CTR | # WINNER | WINNERS | $R_R=$ | \multicolumn{12}{c}{ACCUMULATED WINS} |
|---|---|---|---|---|---|---|---|---|---|---|---|---|---|---|---|
| | | | | 0 | 1 | 2 | 3 | 4 | 5 | 6 | 7 | 8 | 9 | 10 | 11 |
| 15 | 2 | 000011000000 | 4 | 0 | 0 | 0 | 0 | 1 | 1 | 0 | 0 | 0 | 0 | 0 | 0 |
| 31 | 1 | 010000000000 | 5 | 0 | 1 | 0 | 0 | 1 | 1 | 0 | 0 | 0 | 0 | 0 | 0 |
| 47 | 2 | 000011000000 | 4 | 0 | 1 | 0 | 0 | 2 | 2 | 0 | 0 | 0 | 0 | 0 | 0 |
| 63 | 2 | 100001000000 | 6 | 1 | 1 | 0 | 0 | 2 | 3 | 0 | 0 | 0 | 0 | 0 | 0 |
| 79 | 2 | 000011000000 | 4 | 1 | 1 | 0 | 0 | 3 | 4 | 0 | 0 | 0 | 0 | 0 | 0 |
| 95 | 1 | 010000000000 | 5 | 1 | 2 | 0 | 0 | 3 | 4 | 0 | 0 | 0 | 0 | 0 | 0 |
| 111 | 2 | 000011000000 | 4 | 1 | 2 | 0 | 0 | 4 | 5 | 0 | 0 | 0 | 0 | 0 | 0 |
| 127 | 0 | 000000000000 | 7 | 1 | 2 | 0 | 0 | 4 | 5 | 0 | 0 | 0 | 0 | 0 | 0 |
| 143 | 2 | 000011000000 | 4 | 1 | 2 | 0 | 0 | 5 | 6 | 0 | 0 | 0 | 0 | 0 | 0 |
| 159 | 1 | 010000000000 | 5 | 1 | 3 | 0 | 0 | 5 | 6 | 0 | 0 | 0 | 0 | 0 | 0 |
| 175 | 2 | 000011000000 | 4 | 1 | 3 | 0 | 0 | 6 | 7 | 0 | 0 | 0 | 0 | 0 | 0 |
| 191 | 2 | 100001000000 | 6 | 2 | 3 | 0 | 0 | 6 | 6 | 0 | 0 | 0 | 0 | 0 | 0 |
| 207 | 2 | 000011000000 | 5 | 2 | 3 | 0 | 0 | 7 | 9 | 0 | 0 | 0 | 0 | 0 | 0 |
| 223 | 1 | 010000000000 | 5 | 2 | 4 | 0 | 0 | 7 | 9 | 0 | 0 | 0 | 0 | 0 | 0 |
| 239 | 2 | 000011000000 | 5 | 2 | 4 | 0 | 0 | 8 | 10 | 0 | 0 | 0 | 0 | 0 | 0 |
| '255 | 3 | 101000000001 | 4 | 3 | 4 | 1 | 0 | 8 | 10 | 0 | 0 | 0 | 0 | 0 | 1 |
| 271 | 2 | 000011000000 | 5 | 3 | 4 | 1 | 0 | 9 | 11 | 0 | 0 | 0 | 0 | 0 | 1 |
| 287 | 1 | 010000000000 | 4 | 3 | 4 | 1 | 0 | 9 | 11 | 0 | 0 | 0 | 0 | 0 | 1 |
| 303 | 2 | 000011000000 | 4 | 3 | 5 | 1 | 0 | 10 | 12 | 0 | 0 | 0 | 0 | 0 | 1 |
| 319 | 2 | 100001000000 | 6 | 4 | 5 | 1 | 0 | 10 | 13 | 0 | 0 | 0 | 0 | 0 | 1 |
| 335 | 2 | 000011000000 | 4 | 4 | 5 | 1 | 0 | 11 | 14 | 0 | 0 | 0 | 0 | 0 | 1 |
| 351 | 1 | 010000000000 | 5 | 4 | 6 | 1 | 0 | 11 | 14 | 0 | 0 | 0 | 0 | 0 | 1 |
| 367 | 2 | 000011000000 | 4 | 4 | 6 | 1 | 0 | 12 | 15 | 0 | 0 | 0 | 0 | 0 | 1 |
| 383 | 0 | 000000000000 | 7 | 4 | 6 | 1 | 0 | 12 | 15 | 0 | 0 | 0 | 0 | 0 | 1 |
| 399 | 2 | 000011000000 | 4 | 4 | 6 | 1 | 0 | 13 | 16 | 0 | 0 | 0 | 0 | 0 | 1 |
| 415 | 1 | 010000000000 | 5 | 4 | 7 | 1 | 0 | 13 | 16 | 0 | 0 | 0 | 0 | 0 | 1 |
| 431 | 2 | 000011000000 | 4 | 4 | 7 | 1 | 0 | 14 | 17 | 0 | 0 | 0 | 0 | 0 | 1 |
| 447 | 2 | 100001000000 | 6 | 5 | 7 | 1 | 0 | 14 | 18 | 0 | 0 | 0 | 0 | 0 | 1 |
| 463 | 2 | 000011000000 | 4 | 5 | 7 | 1 | 0 | 15 | 19 | 0 | 0 | 0 | 0 | 0 | 1 |
| 479 | 1 | 010000000000 | 5 | 5 | 8 | 1 | 0 | 15 | 19 | 0 | 0 | 0 | 0 | 0 | 1 |
| 495 | 2 | 000011000000 | 4 | 5 | 8 | 1 | 0 | 16 | 20 | 0 | 0 | 0 | 0 | 0 | 1 |
| 511 | 0 | 000000000000 | – | 5 | 8 | 1 | 0 | 16 | 20 | 0 | 0 | 0 | 0 | 0 | 1 |

*FIG. 8.*

ReqMatrix = TransposeTable masked by Req Vector
(force idle ports have to have all-zero columns)

ReqBits = [OR(MSrow of ReqMatrix),...
            OR(LSrow of ReqMatrix)]

LSReqs = Extend(ReqBits)=[0,...0, 1st req, 1....1]
            - Set all bits after first 1

CtrMask<8:0> = $\overline{\text{LSReqs<0:8>}}$ - reverse and complement
            Ctr = Ctr OR CtrMask Winners = ReqMatrix(RightMost0(Ctr))--get row of table yes
Winners = 0? ———→ Ctr = Ctr + 1
          no i = LeftMostOne(Winners)
Port i wins arbitration
Winners<i>=0

$$\text{TransposeTable} = \begin{bmatrix} \text{Port 0 Bias} \\ \text{Port 1 Bias} \\ \vdots \\ \text{Port P Bias} \end{bmatrix} \begin{matrix} \text{MSB} \\ \\ \\ \text{LSB} \end{matrix}$$

ReqMatrix = Transpose table outputs output ANDed with
            appropriate Reqbits Ctr = 9-bit binary req. Output are ORed with ReqMask,
      then +1 circuit feeds back ReqMask = Shortens length of counter to count past zero
          rows of ReqMatrix

*FIG. 10.*

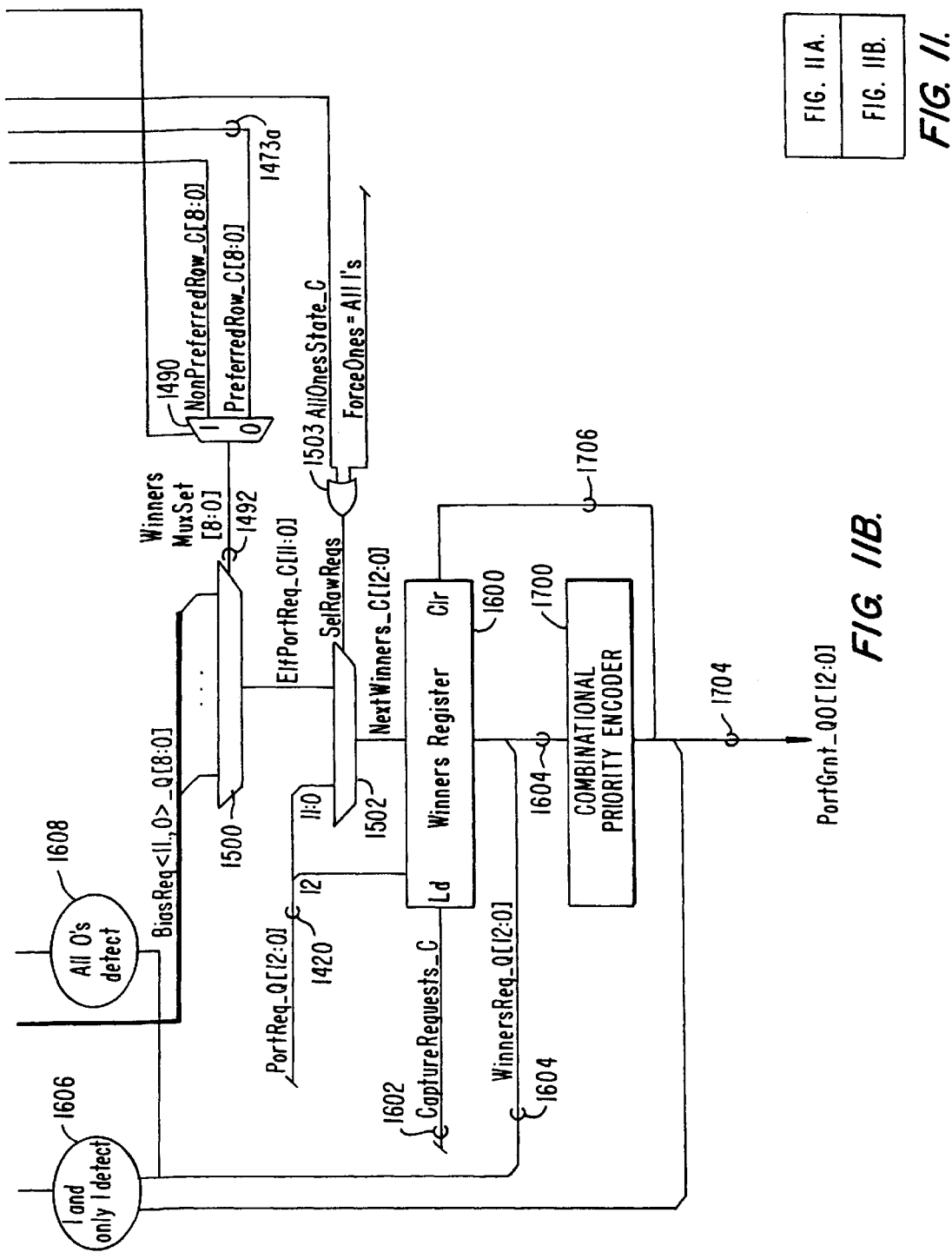

| CTR | # WINNER | WINNERS | $R_R=$ | _____ACCUMULATED WINS_____ | | | | | | | | | | | |
|---|---|---|---|---|---|---|---|---|---|---|---|---|---|---|---|
| | | | | 0 | 1 | 2 | 3 | 4 | 5 | 6 | 7 | 8 | 9 | 10 | 11 |
| 15 | 2 | 000011000000 | 4 | 0 | 0 | 0 | 0 | 1 | 1 | 0 | 0 | 0 | 0 | 0 | 0 |
| 31 | 1 | 010000000000 | 5 | 0 | 1 | 0 | 0 | 1 | 1 | 0 | 0 | 0 | 0 | 0 | 0 |
| 47 | 2 | 000011000000 | 4 | 0 | 1 | 0 | 0 | 2 | 2 | 0 | 0 | 0 | 0 | 0 | 0 |
| 63 | 2 | 100001000000 | 6 | 1 | 1 | 0 | 0 | 2 | 3 | 0 | 0 | 0 | 0 | 0 | 0 |
| 79 | 2 | 000011000000 | 4 | 1 | 1 | 0 | 0 | 3 | 4 | 0 | 0 | 0 | 0 | 0 | 0 |
| 95 | 1 | 010000000000 | 5 | 1 | 2 | 0 | 0 | 3 | 4 | 0 | 0 | 0 | 0 | 0 | 0 |
| 111 | 2 | 000011000000 | 4 | 1 | 2 | 0 | 0 | 4 | 5 | 0 | 0 | 0 | 0 | 0 | 0 |
| 127 | 0 | 000000000000 | 7 | 1 | 2 | 0 | 0 | 4 | 5 | 0 | 0 | 0 | 0 | 0 | 0 |
| 143 | 2 | 000011000000 | 4 | 1 | 2 | 0 | 0 | 5 | 6 | 0 | 0 | 0 | 0 | 0 | 0 |
| 159 | 1 | 010000000000 | 5 | 1 | 3 | 0 | 0 | 5 | 6 | 0 | 0 | 0 | 0 | 0 | 0 |
| 175 | 2 | 000011000000 | 4 | 1 | 3 | 0 | 0 | 6 | 7 | 0 | 0 | 0 | 0 | 0 | 0 |
| 191 | 2 | 100001000000 | 6 | 2 | 3 | 0 | 0 | 6 | 6 | 0 | 0 | 0 | 0 | 0 | 0 |
| 207 | 2 | 000011000000 | 5 | 2 | 3 | 0 | 0 | 7 | 9 | 0 | 0 | 0 | 0 | 0 | 0 |
| 223 | 1 | 010000000000 | 5 | 2 | 4 | 0 | 0 | 7 | 9 | 0 | 0 | 0 | 0 | 0 | 0 |
| 239 | 2 | 000011000000 | 5 | 2 | 4 | 0 | 0 | 8 | 10 | 0 | 0 | 0 | 0 | 0 | 0 |
| 255 | 3 | 101000000001 | 4 | 3 | 4 | 1 | 0 | 8 | 10 | 0 | 0 | 0 | 0 | 0 | 1 |
| 271 | 2 | 000011000000 | 5 | 3 | 4 | 1 | 0 | 9 | 11 | 0 | 0 | 0 | 0 | 0 | 1 |
| 287 | 1 | 010000000000 | 4 | 3 | 4 | 1 | 0 | 9 | 11 | 0 | 0 | 0 | 0 | 0 | 1 |
| 303 | 2 | 000011000000 | 4 | 3 | 5 | 1 | 0 | 10 | 12 | 0 | 0 | 0 | 0 | 0 | 1 |
| 319 | 2 | 100001000000 | 6 | 4 | 5 | 1 | 0 | 10 | 13 | 0 | 0 | 0 | 0 | 0 | 1 |
| 335 | 2 | 000011000000 | 4 | 4 | 5 | 1 | 0 | 11 | 14 | 0 | 0 | 0 | 0 | 0 | 1 |
| 351 | 1 | 010000000000 | 5 | 4 | 6 | 1 | 0 | 11 | 14 | 0 | 0 | 0 | 0 | 0 | 1 |
| 367 | 2 | 000011000000 | 4 | 4 | 6 | 1 | 0 | 12 | 15 | 0 | 0 | 0 | 0 | 0 | 1 |
| 383 | 0 | 000000000000 | 7 | 4 | 6 | 1 | 0 | 12 | 15 | 0 | 0 | 0 | 0 | 0 | 1 |
| 399 | 2 | 000011000000 | 4 | 4 | 6 | 1 | 0 | 13 | 16 | 0 | 0 | 0 | 0 | 0 | 1 |
| 415 | 1 | 010000000000 | 5 | 4 | 7 | 1 | 0 | 13 | 16 | 0 | 0 | 0 | 0 | 0 | 1 |
| 431 | 2 | 000011000000 | 4 | 4 | 7 | 1 | 0 | 14 | 17 | 0 | 0 | 0 | 0 | 0 | 1 |
| 447 | 2 | 100001000000 | 6 | 5 | 7 | 1 | 0 | 14 | 18 | 0 | 0 | 0 | 0 | 0 | 1 |
| 463 | 2 | 000011000000 | 4 | 5 | 7 | 1 | 0 | 15 | 19 | 0 | 0 | 0 | 0 | 0 | 1 |
| 479 | 1 | 010000000000 | 5 | 5 | 8 | 1 | 0 | 15 | 19 | 0 | 0 | 0 | 0 | 0 | 1 |
| 495 | 2 | 000011000000 | 4 | 5 | 8 | 1 | 0 | 16 | 20 | 0 | 0 | 0 | 0 | 0 | 1 |
| 511 | 7 | 111011000011 | - | 6 | 9 | 2 | 0 | 11 | 21 | 0 | 0 | 0 | 0 | 0 | 2 |

*FIG. 12.*

TRANSPOSE TABLE BIASED ARBITRATION SCHEME

CROSS-REFERENCES TO RELATED APPLICATION

This application is a Continuation-in-Part of application Ser. No. 09/073,401, (U.S. Pat. No. 6,424,655 B1), filed May 13, 1998, the disclosure of which is incorporated herein by reference.

BACKGROUND OF THE INVENTION

The present invention relates generally to techniques for arbitrating access to a shared resource. One particular example is a device having multiple inputs and outputs for routing message traffic in a communications network. More particularly, the invention relates to a method, and apparatus for implementing that method, to bias the arbitration between two or more inputs of the device that are contending for data communication access to the same output of the device.

As multiprocessing environments grow, the ability to provide data communication between the individual system elements (i.e., processors and peripheral equipment) of the system requires careful thought so as not to inadvertently give a system element unfair access to a communications path or some other shared resource (e.g., a multiple-user bus system) while, at the same time, limiting such access to other system elements.

Many of today's data communication networking configurations will use various devices (typically, "routers") to direct or otherwise route message traffic from one communications link to one of a number of other communications links. However, message traffic can be received at two or more inputs of the device at substantially the same time bound for the same output, raising the issue of which of the two will be allowed to proceed before the other, i.e., who goes first. Access to the output requires some form of arbitration between the two contending inputs. Smaller systems (i.e., those with a small number of system elements needing to communicate with one another) may use such classic arbitration techniques as assigning fixed priorities to the inputs or "round-robin" processing. In the former, each port input is provided a predetermined priority to form a hierarchical arbitration scheme. Inputs with higher priority will be given access to an output over inputs with lower pre-assigned priorities seeking access to that same output. The round-robin technique involves assigning priorities according to a predetermined order among the inputs. As message traffic is received, the priorities change so that the last input granted access to a particular output is then given the lowest priority, and the next input in order now has the highest priority; the remaining inputs will have their priorities similarly changed according to the predetermined order.

Similar techniques may be used in other shared resource environments such as, for example, multiple-user bus systems, to allocate access to the bus between connected controllers.

As computing systems become more complex, so that the number of elements (processors and peripheral units) increase, it would not be unusual for an input of a routing device to be required to route message traffic from several elements. Further, routing devices are sometimes cascaded to form, for example, tree-like network configurations, increasing the number of system elements that may need to route message traffic through an input of a routing device. Using pre-assigned priorities, round-robin processing, or other similar techniques can unfairly allocate the services of a routing device's input to some of the system's elements at the expense of other elements that use another input of that routing device. For example, a routing device may receive at one input message traffic from only one system element, while another input of that same routing device is required to service several elements. Using any of the above techniques will operate to give more of the routing device's attention to the one element, and less attention to each of the several elements using the second input. Thus, prior arbitration techniques can unfairly allocate more of the routing device's services to the input having the lesser number of system elements using that routing device.

One solution to assuring fair allocation of services to device inputs is to use biased arbitration techniques. With biased arbitration, each input has a bias value that determines the percentage of time it will win arbitration.

Biased arbitration can be used either to assure fair access to all nodes, or to purposely give some paths higher priority than other paths. Biased arbitration can be used to help support quality of services (QOS) guarantees for real-time or constant bit rate traffic.

One biased arbitration system is described in U.S. Pat. No. 5,694,121, assigned to the assignee of the present application, which discloses an ALU arbitration technique. Each port has a bias value provided and has an associated accumulator. The port with the highest value in its accumulator wins arbitration. The winner then decrements its accumulator by the sum of the bias values of all the losers, and each loser increments its accumulator by its own bias value. Another biased arbitration system is described in U.S. Pat. No. 5,710,549, which is also assigned to the assignee of the present application.

This ALU biasing scheme works well for routers with small numbers of ports. However, it does not scale well to larger routers because large adders and logic for pairwise comparisons of all accumulators are required to determine a current arbitration winner.

Accordingly, research continues to develop effective biased arbitration techniques of utility on complex systems.

SUMMARY OF THE INVENTION

According to one aspect of the present invention, requestors are assigned bias values which are encoded as binary bias vectors. The bias vectors are stored as columns in a matrix, with each column corresponding to a particular requester. During an arbitration the rows of the matrix are fetched; thus, the matrix is designated a transpose matrix. The rows are fetched in a way that gives the correct biasing and also gives the lowest possible latency.

According to another aspect of the invention, the rows are fetched by a mapped counter output. The counter output is mapped so that rows having more significant bit positions of the binary bias vectors are fetched more frequently than less significant bit positions.

According to another aspect of the invention, rows having all zeros are skipped because those rows indicate that no access will be granted. A skip-row signal is asserted for rows having all zeros and to be accessed after the row having all zeros is substituted.

According to another aspect of the invention, an unbiased cycle is generated where all ports requesting access are serviced regardless of their bias values.

According to another aspect of the invention, bias vectors for requestors not having a request pending are masked during an arbitration.

According to another aspect of the invention, most significant rows having no active request are masked to avoid fetching the rows.

Other features and advantages will be apparent in view of the following detailed description and appended drawings.

BRIEF DESCRIPTION OF THE DRAWINGS

FIG. 5 is a table depicting a transpose table;

FIG. 6 is a table depicting a counter mapping function;

FIG. 7 is a table depicting a request matrix;

FIG. 8 is a table depicting the results of an arbitration utilizing the request matrix of FIG. 7;

FIG. 10 is a flowchart illustrating the operation of the hardware realization of FIG. 9;

FIG. 12 is a table depicting the results of an arbitration utilizing the request matrix of FIG. 7 resulting from the hardware realization of FIG. 11;

DESCRIPTION OF THE SPECIFIC EMBODIMENTS

The present invention has utility in any system where a number of requestors periodically request access to a shared resource.

The preferred embodiments will first be described in the context of a system area network utilizing routers having a plurality of ports. As will be described in more detail below the biased arbitration technique is scalable to systems having large numbers of requestors requesting access to single shared resource.

Figure 1:
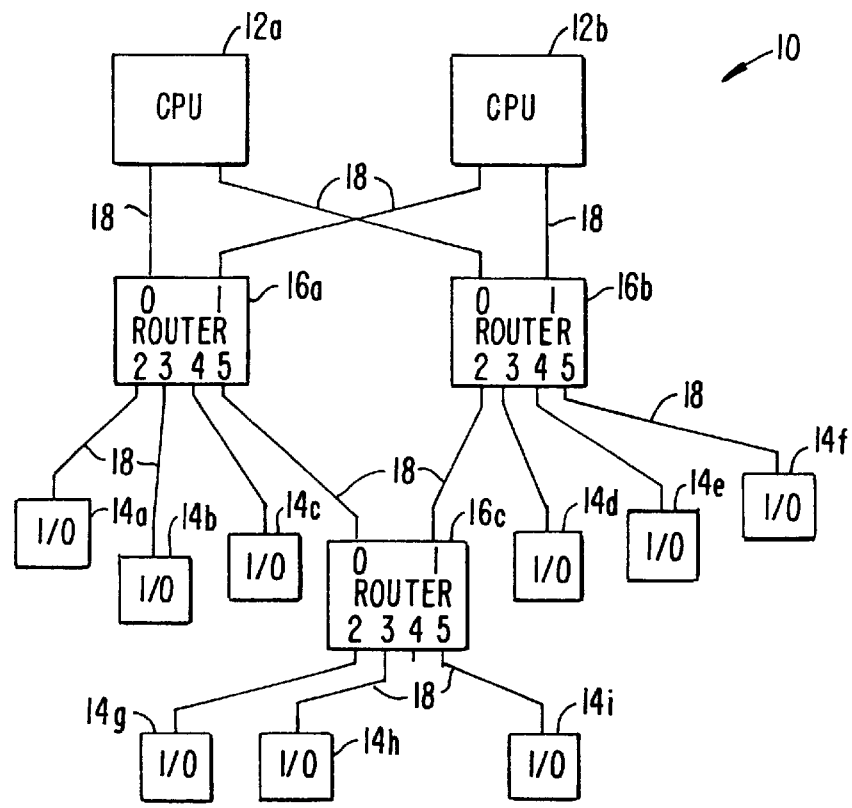
FIG. 1 is a simplified block diagram of a multiple processor system comprising a pair of central processing units (CPUs) coupled to one another and a plurality of input/output (I/O) units by a system area network ("SAN") for communicating message traffic therebetween using router units incorporating the present invention.

Turning now to the figures, and for the moment initially FIG. 1, there is illustrated a simplified multiple processing system, designated generally with the reference numeral 10. As shown, the multiple processing system 10 comprises at least a pair of central processing units (CPUs) 12a, 12b, and a plurality of input/output units 14 (14a, 14b, . . . , 14i) interconnected in a system area network configuration by routing units, or routers, 16, and bidirectional communication links 18. Message traffic between the various elements of the system 10 is in the form of data packets comprising serially transmitted 10-bit symbols, together with the necessary transmitting clocks for synchronous transfers of the symbols. The symbols are encoded to form either data or commands used for network protocol flow control. Network flow control is not relevant to the understanding or implementation of the present invention and, therefore, is not discussed further herein, except as necessary to the description of certain of the elements of the router units 16. Each message, however, contains data identifying the source and destination of the message. The destination is used by the routers 16 to select the port output from which the message will be re-transmitted.

Continuing with FIG. 1, each of the routers 16 has six bi-directional ports (0, 1, . . . , 5), each having an port input at which message traffic may be received, and an port output from which message traffic can be sent. Each of the ports 2, 3, 4 (and 0 and 1) of the router 16a services (i.e., routes traffic from) only one system element. Port 5, on the other hand, has as many as eight system elements capable of sending message traffic for routing through that port: both CPUs 12 (via routers 16b and 16c),and six I/O units 14 (via routers 16b and 16c). It is possible that all 8 possible sources could transmit message traffic to be routed via the port input of port 5 of router 16a for transmission through an port output of the router 16a, for example port output (0) of port 0.

In contrast, ports 1–4 of the router 16a have only a single element that may need to contend for access to the port output of port 0. An arbitration method in which equal access to an port output is granted each port input would provide each of the I/O units 14a, 14b, and 14c respectively connected to the ports 2, 3, and 4 with more frequent access to the port 0 than that provided the I/O units 14g, 14h, and 14i that send message traffic to port 5 of the router 16a. The present invention works to alleviate that problem by biasing port 5 of router 16a to give it more frequent access to port 0 (or any other port) than ports 2–4.

Figure 2:
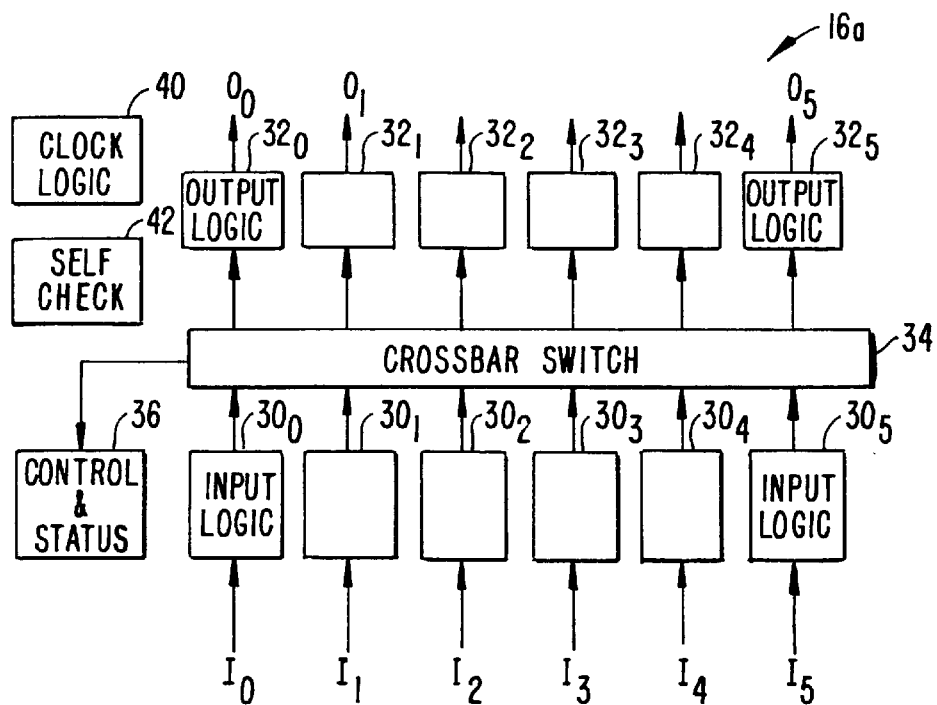
FIG. 2 is a simplified block diagram of a router unit used in the system area network of FIG. 1, illustrating its construction, including its multiple, separate input and port outputs whereat message traffic is received and re-transmitted.

Turning now to FIG. 2, a simplified block diagram of the router 16a is illustrated. It will be appreciated that the routers 16b and 16c are structured substantially the same as the router 16a, unless otherwise noted, so that the following description of the router 16a will apply equally to the routers 16b, 16c.

As indicated above, each of the ports 0, 1, . . . , 5 can receive and/or transmit message traffic. FIG. 2 shows, therefore, the router 16a as having, for each port 0, 1, . . . , 5, an port input (I) for receiving message traffic, and an port output (O) from which for message traffic is transmitted. Each port input has an associated input logic 30 ($30_0$, $30_1$, . . . , $30_5$) for handling receipt of message traffic, and output logic 32 ($32_0$, $32_1$, . . . , $32_5$) from which message traffic is transmitted. Incoming message traffic is routed from the input logic 30 of the receiving port to one of the port outputs by a crossbar switch 34, controlled in part by control and status logic 36 (as well as the individual output logic elements 32, as will be discussed further below). Thus, for example, message traffic received by the port input I(0) of port 0 is applied to the associated input logic $30_0$ and routed to a designated output logic (e.g., output logic $30_3$) by the crossbar switch 34. The port output O(3) of port 3 has output logic $32_3$ for transmitting data coupled thereto.

A control and status logic element contains the various state machines that effect synchronous control over most of the operation of the router. Additionally, the router 16a includes clock logic 40 for supplying various clocking signals necessary to synchronously operate the elements of the router, and self-check circuitry 42 that performs certain self-check operations not relevant to the invention herein with one exception.

Figure 3:
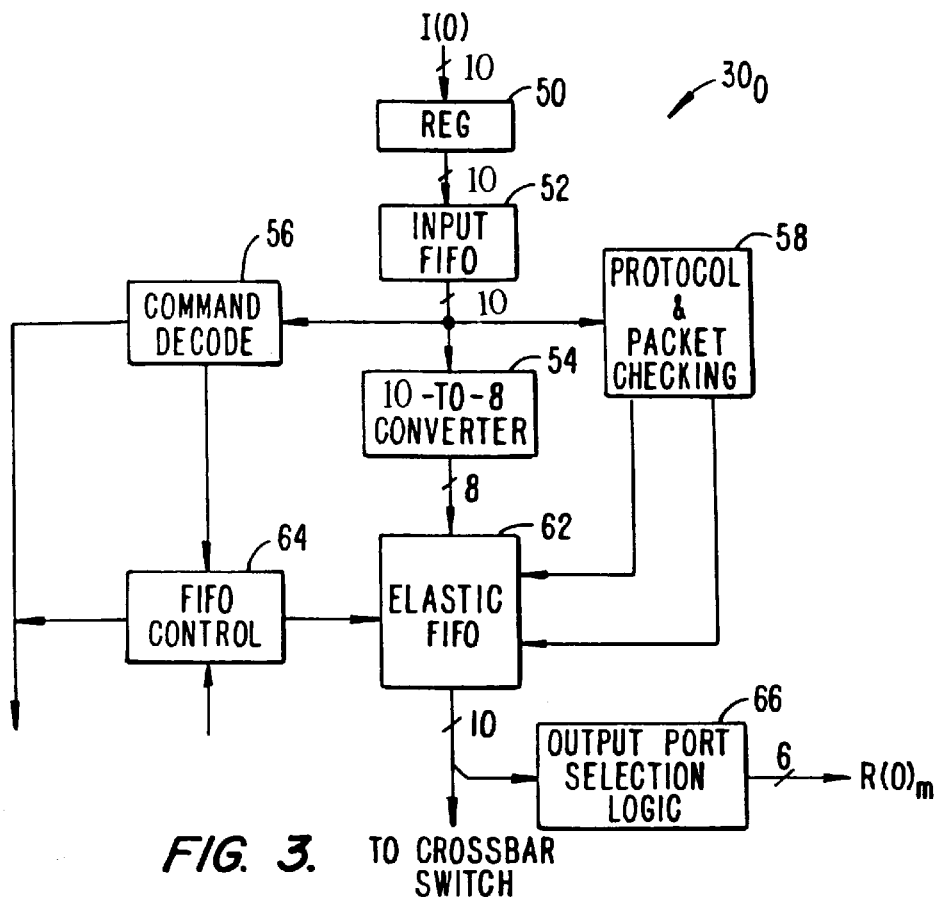
FIG. 3 is a simplified block diagram of the input logic associated with a port input of the router unit shown in FIG. 2.
Figure 4:
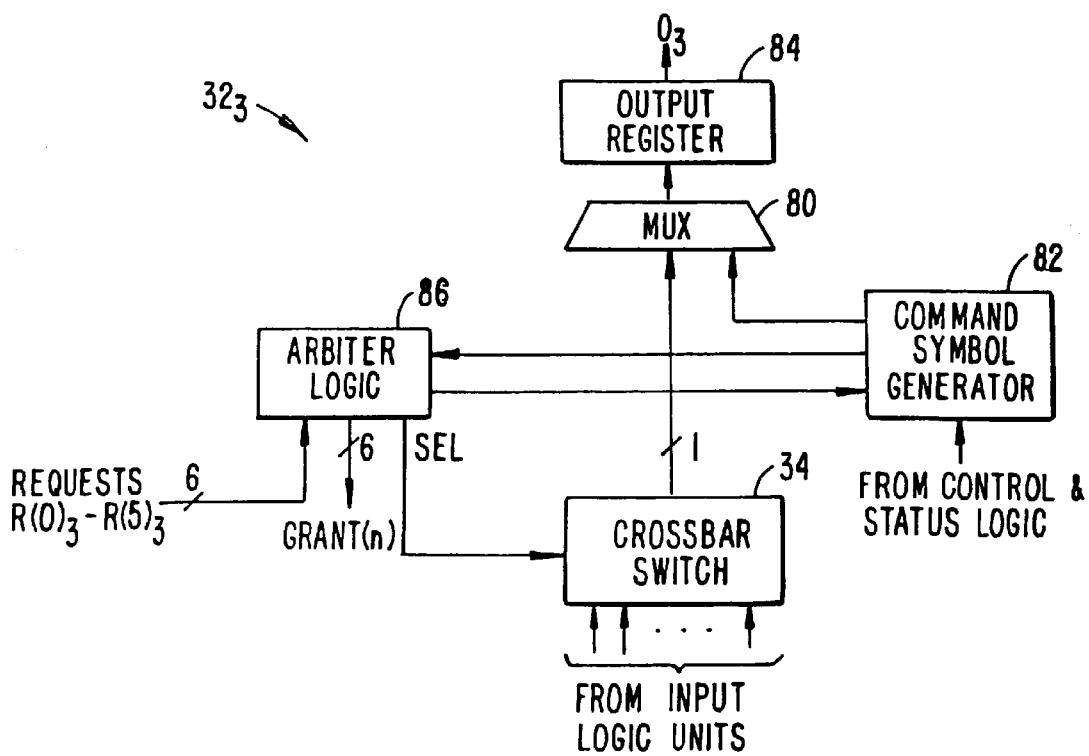
FIG. 4 is a simplified block diagram of the output logic associated with a port output of the router unit of FIGS. 1 and 2.

Referring now to FIG. 3, a block diagram of the input logic 300 is illustrated of the port input I(0). The input logic $30_1, \ldots 30_5$ for the other port input I(1), . . . , I(5) are of substantially identical construction, and unless noted otherwise the description of the input logic $30_0$ should be taken as a description of the input logic $30_1, \ldots 30_5$.

FIG. 3 shows the input logic 300 as including an input register 50 that operates to receive and buffer the incoming message traffic for transfer to an input first-in-first-out buffer queue (FIFO) 52. The FIFO 52 operates to provide synchronization between the clock signal (not shown) that originates at the transmitting entity, and is used to clock data into the register 50 and the FIFO 52, and the (local) clock is used to pull symbols form the FIFO 52.

Information from the input FIFO 52 is coupled to a 10-to-8 (bit) converter 54 that converts each 10-bit symbol from its encoded form to byte form. In addition, the output of the input FIFO 52 is coupled to a command decode element 56 and a protocol and packet checking unit 58. The command decode unit 56 examines each symbol to determine if it is a flow control command, and therefore a command that the router must act upon, or data, which need not be acted upon by the router (other than routing it to the proper port output). The protocol and packet checking unit 58 operates to ensure that the packet meets the necessary protocol of transfer, and checks the concluding check sum of the packet to ensure that the packet was transmitted to the router 16a properly. If not, the protocol and packet checking unit 58 will tack onto the end of the packet a symbol that identifies the packet as possibly being erroneous.

Incoming message traffic, passed through the 10-to-8 bit converter 54, is received and temporarily stored in an elastic FIFO 62, controlled by a FIFO control 64. The FIFO 62 provides sufficient temporary storage to allow the Destination ID of the incoming message packet to be examined, and to allow time for the port outputs to operate the crossbar switch 34 to route the message traffic. The FIFO 62 must also provide sufficient storage to allow sufficient time to halt the incoming message traffic transmission in the event the receiving port input must wait.

Selection of the proper port output, however, depends upon the destination address contained in the incoming message packet. That determination is made by the port output selection logic 66 which receives the destination address contained in the incoming message packet. From the destination address the port output selection logic 66 identifies the designated port output, asserting a request signal on one of six request lines, R(0)m, where m=0, 1, . . . , 5, identifying the requested port output.

In the above description, provided primarily for background purposes a router having six ports is described. In the following description of a preferred embodiment a router having twelve ports is employed. The particular configuration of the router, including the number of ports, is not critical to or a part of the present invention.

Before continuing, a word about notation: in the following a biased arbitration scheme is described for a router having 12 ports; thus, the port output selection logic 66 produces twelve output signals, each of which is carried on one of twelve request lines R(0)0, R(0)1, . . . , R(0)11. The form of the request signal lines is R(n)m, where n (0, 1 . . . 11) identifies the driving source of the signal line, and m (m=1, 2, . . . , 11) identifies the destination of the signal carried. Accordingly, the port output selection logic 66 drives the twelve request lines R(0)0, R(0)1, . . . , R(0)11 each of which couple the signal they may carry to output logic $32_0, 32_1, \ldots, 32_{11}$, respectively. In similar fashion, the output logic 32 of each port output will grant access, in response to received request signals, by asserting a GRANT signal on one of twelve signal lines GRANT(n)m. Again, the n will identify the output logic driving the signal line, and the m will identify the input logic 30 receiving that driving signal. Unless noted otherwise, this notation is used throughout this discussion.

An embodiment of the bias logic of the present invention will now be described. First, a conceptual explanation of the embodiment will be described with reference to FIGS. 5–8, then a hardware realization of the embodiment will be described with reference to FIGS. 9–10. The operation of the invention will be described in the context of the system area network described above with reference to FIGS. 1–4.

Turning now to FIG. 5, a transposed table of bias values 100 is depicted. Each column 120 of the transposed table 100 is a binary bias vector encoding the bias value of the port input listed above the column 120. The rows are numbered starting from the most significant bit of each vector 120. Beside each row is a power of 2 indicating the value of the place holder in each column.

The table is accessed row by row during an arbitration to grant access to ports having requests pending. The frequency with which each port gains access is determined by the frequency with which rows including a "1" in the port's binary bias vector are accessed. The frequency with which each row is accessed is determined by a unique counter mapping technique described below.

During arbitration the rows are selected using the mapped output of a counter. The mapping function is depicted as a table 200 in FIG. 6 with the bit positions of the counter output (0 to 8) listed at the top of the table 200 and the row accessed listed to the right of the table 200. Note that the effect of the mapping function is to select the row corresponding to the position of the rightmost 0 in the counter output.

As the count increments the rows are accessed in the following order:

| CTR | 0 | 1 | 2 | 3 | 4 | 5 | 6 | 7 | 8 | 9 | 10 | 11 |
|-----|---|---|---|---|---|---|---|---|---|---|----|----|
| ROW | 0 | 1 | 0 | 2 | 0 | 1 | 0 | 3 | 0 | 1 | 0  | 2  |

The mapped counter input interleaves frequent access wins by row 0 (ports with bias values of 256 or more) with access wins by other rows. From the above, a person of skill in the art will recognize that each row is accessed half as often as the row above. This is indicated by the powers of 2 in FIG. 5.

The transposed table 200 is a static representation of the bias values of the port inputs. During an arbitration only certain ones of the port inputs will request access to the output ports. In the SAN described above, the output port selection logic 66 (FIG. 3) generates a request signal for a requesting input. The request signals from all the input ports form a Req Vector having "1"s indicating those port inputs requesting access and "0"s for those port inputs not requesting access. The columns 120 in the transpose table are set to all "0"s for those ports not requesting access. The result is a Req Matrix 300 depicted in FIG. 7.

In the example of FIG. 7 the bias values are set to the decimal values of 5, 8, 1, 0, 16, 20, 0, 0, 0, 0, 0, 1. The Req Vector indicates that port inputs 3, 6, 7, 8, and 9 are not requesting access to the output port during this access cycle.

Note that in the Req Matrix 300 of FIG. 7, the first four rows contain all zeros. Accordingly, accessing these rows does not result in any port inputs winning access to the output ports. In a preferred embodiment, the count values selecting these rows are masked so that the rows are not output to the access granting system.

The LSReq bits are depicted at the right of the Req Matrix 300 of FIG. 7. Each LSReq bit is the logical sum (OR) of all the bits in a corresponding row and the LSReq bit of the row above. The LSReq bits are utilized to form mask bits that mask the all "0" rows. The effect of the four mask bits is to cause the counter to increment by 16 between each row access so that the top four rows are not accessed.

When a row is accessed, the ports indicated by "1"s in the row are given access to the output port starting from the left side of the row.

FIG. 8 depicts the results of an arbitration based on the Req Matrix 300 of FIG. 7. The operation of the system during an arbitration cycle is best understood by considering the concrete results depicted in FIG. 8.

In FIG. 8, the columns represent the masked counter output value (CTR); the number of winners per row (# Winners); the row accessed (Winners); the number of the row accessed (Row #); and the cumulative number of accesses granted to each port up to and including the current counter value (Accumulated Wins). Note that, due to the masking of the four lowest bits, the counter increments by 16 during row accesses. Also, the unmasked row in the largest MSB position (row 4 is this case) is accessed every other cycle due to the counter mapping function.

Row 4, which is in this case is the most significant non-zero row, is accessed every other clock to assure that ports having binary request vector "1"s in this row will have their requests handled most frequently. However, accesses to other rows are interspersed according to their significance so that no port is frozen out of the arbitration.

Figure 9:
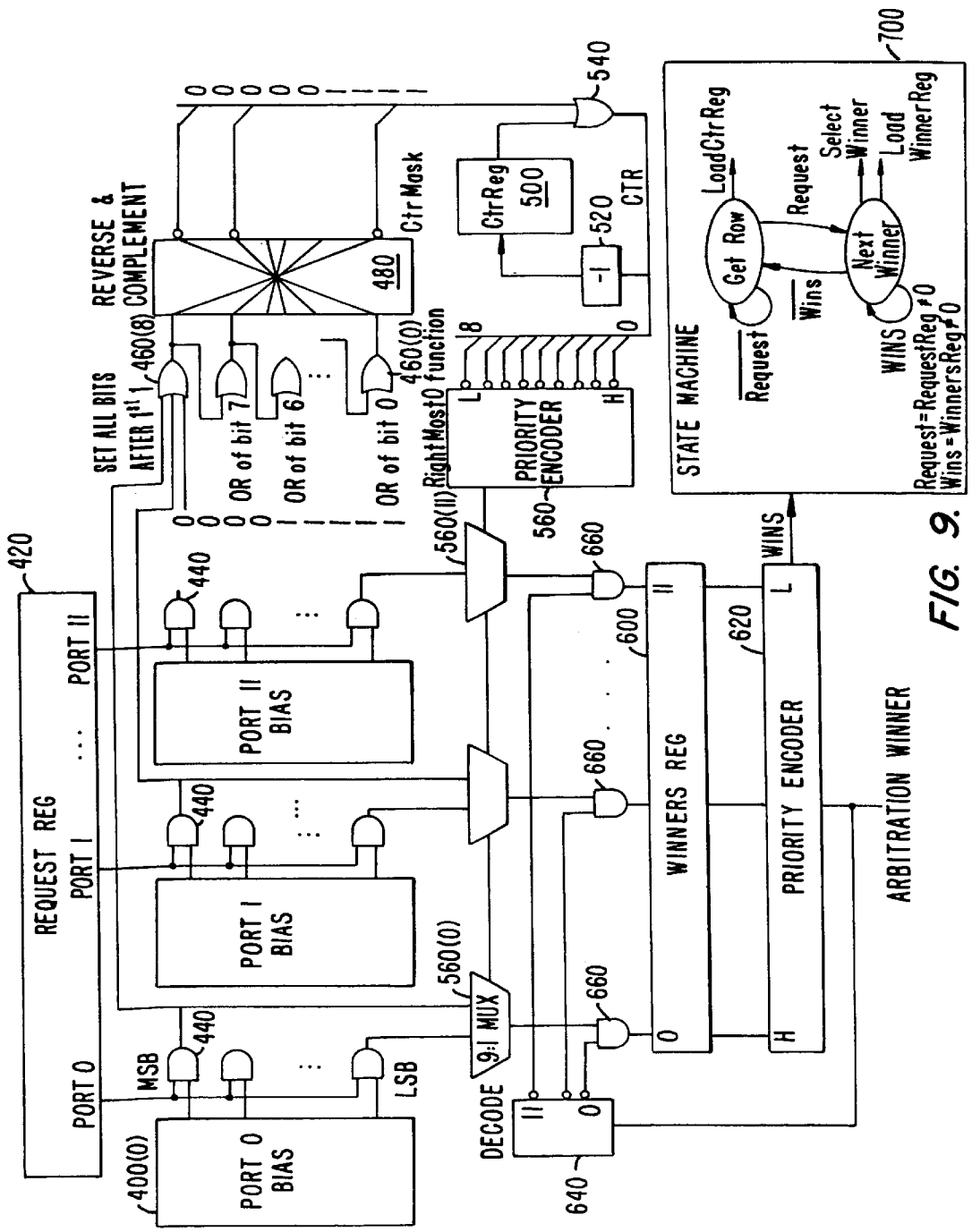
FIG. 9 is a schematic diagram of a hardware realization of a preferred embodiment of the invention.

FIG. 9 depicts a hardware realization of a preferred embodiment of the invention. This logic is included in the arbiter logic 86 (FIG. 3) of the SAN described above. However, in the example described below, biased arbitration logic for a router having 12 inputs is described.

In FIG. 9, each of the 12 columns of the transpose table are held in a bias value register 400(0) to 400(11). The Req Vector is held in a Request Reg 420. Each of the bits of the Req Vector is supplied by output port selection logic 66 (FIG. 3) of a port input. The Req Masking circuit is realized by AND gates 440 which output one value of a transpose table column ANDed with the corresponding bit value of the Req Vector. Thus, the outputs of the AND gates 440 for a port not requesting access are all "0"s.

All the bits from each row of the Req Matrix are input to a corresponding OR gate 460(0) to 460(8) to output the LSreg bits. Note that the output of each OR gate 460 is coupled to the input of the OR gate for the next lowest row to assure that one and output of one is generated, ones will be generated by tall the lower OR gates 460. The LSreq bits are reversed and complemented by Reverse & Complement logic 480 to form the Ctr Mask vector.

The counter is implemented utilizing a CtrReg 500 and Incrementer 520. The counter value and Ctr Mask vector are supplied to masking OR gate 540 which outputs the masked counter value. The masked CtrReg output is incremented so that the most significant all zero rows are not accessed.

A mapping priority encoder 560 encodes the position of the rightmost zero in masked counter value. The encoded position controls MUXes 560(0) to 560(11) to select a row of the Req Matrix which is transferred to the Winners Reg 600.

The access granting priority encoder 620 generates an Arbitration Winner signal indicating the identity of the port input winning the arbitration. This Arbitration Winner signal is used to control the switch 34 (FIG. 4) to select the winning input port and also to generate the GRANT(n) signal to inform the winning port that its request has been granted. The access granting priority encoder also asserts a Wins signal each time an input wins an arbitration.

The operation of the system is further depicted by the state machine diagram 700 in FIG. 9 and the flow chart of FIG. 10. Note that as long as the Request signal is not zero, i.e., there is an input port requesting access, the system continues to increment the counter register output to access rows of the Req Matrix 300. Also, for a given row, access will be granted sequentially to all port inputs having "1" in the row until the Win signal is unasserted. Each successive arbitration clears a single bit in the Winners Reg 600 until a series of arbitrations results in clearing the last winner. The Winners Reg 600 is then loaded with the next request row.

Figure 11A:
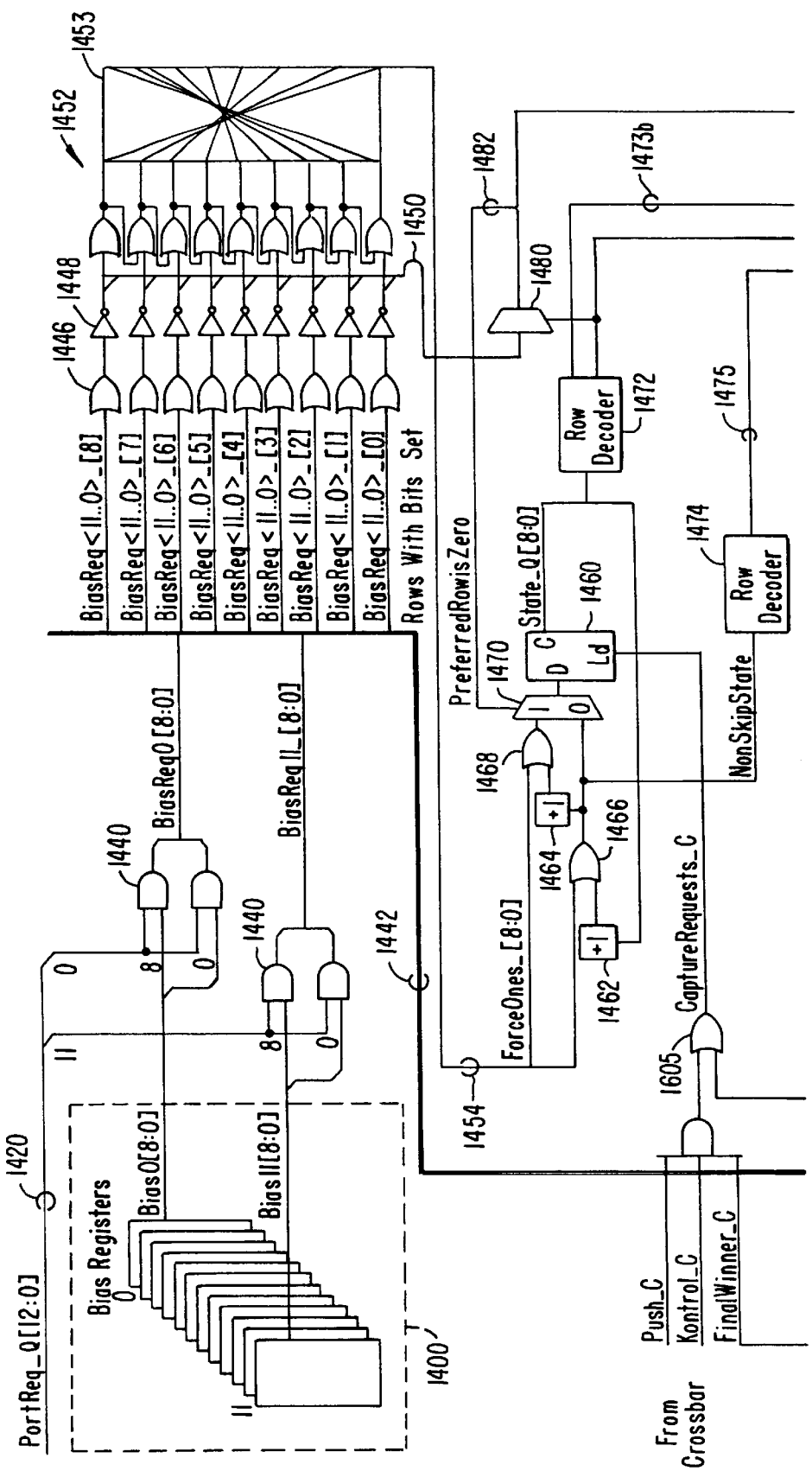
FIG. 11 (parts A & B) is a schematic diagram of a second hardware realization of a preferred embodiment of the invention.

An alternative hardware realization having additional features is depicted in FIG. 11.

In FIG. 11, each of the 12 columns of the transpose table are held in a bias value register 1400(0) to 1400(11), which may be implemented in memory, each holding a nine-bit bias value (Bias0[8:0]–Bias11[8:0]). The Req Vector is supplied as the PortReq signal 1420. Each of the bits of the Req Vector is supplied by output port selection logic 66 (FIG. 3) of a port input. The Req Masking circuit is realized by AND gates 1440 which output one value of a transpose table column ANDed with the corresponding bit value of the Req Vector. Thus, the outputs of the AND gates 1440 for a port not requesting access are all "0"s.

The BiasReq<11 . . . 0>_Q[8:0] bus 1442 groups all the corresponding bits in each Bias signal to form the rows (BiasReq<11 . . . 0>_Q[8] through BiasReq<11 . . . 0>_Q[0]) of the request matrix. Each of these rows are input to OR gates 1446, which output a 0 for a row of all zeros and a 1 otherwise, and inverters 1448. The outputs of the inverters 1448 form the RowsWithBitsSet bus 1450. The RowsWith-BitsSet bus is input to the daisy-chained OR gates 1452, which has its output reversed by the reversing circuit 1453 to generate the ForceOnes bus 1454.

The counter is implemented by a State_Q register 1460, first and second incrementers 1462 and 1464, first and second OR gates 1466 and 1468, and an incrementer MUX 1470. A first row decoder 1472 is coupled to the output of the State_Q register 1460 which also has its output coupled to the input of the first incrementer 1462. The first and second OR gates 1466 and 1468 merge the ForceOnes signal with the respective outputs of the first and second incrementers 1462 and 1464 to perform the same function as the CrtMask of FIG. 9. The output of the first OR gate 1466 is coupled to a 0 input of the incrementer MUX 1470 and to the input of the second incrementer 1464 and the output of the second OR gate 1468 is coupled to a 1 input of the incrementer MUX 1470. The output of first incrementer 1462 is also coupled to the input of a second row decoder 1474. The outputs of the first row decoder 1472 are coupled to the PreferredRow signal line 1473*a* and the AllOnesState__C signal line 1473*b* and the output of the second row decoder 1474 is coupled to the NonPreferredRow__C signal line 1475.

The RowsWithBitsSet bus 1450 is coupled to the input of a look-ahead MUX 1480. The control port of the look-ahead MUX 1480 is coupled to the output of the first row decoder 1472 and the output of the look-ahead MUX 1480 is coupled to a PreferredRowsZero signal line 1482. The outputs of the first and second row decoders 1472 and 1474 are coupled to the inputs of a row-selection MUX 1490 and the output of the row-selection MUX is coupled to a WinnersMuxSel bus 1492. The control inputs of the incrementer MUX 1470 and row-selection MUX 1490 are coupled to the PreferredRowsZero signal line 1482.

The BiasReq bus 1442 provides the rows to the transpose table to a winning-row select MUX 1500 which has its control input coupled to the WinnersMuxSel bus 1492. The output of the winning-row select MUX and the PortReq signals are coupled to the input of a NextWinners MUX 1502. The control gate of the NextWinners MUX is coupled to an OR gate 1503 having the AllOnesState__C and ForceOnes=All 1's signals as inputs and the SelRawReqs signal as its output.

The output of the NextWinners MUX 1502 is coupled to the input of a Winners Register 1600. The Winners Register 1600 has 13 bits, each with its own input, output, and clear lines, and a common parallel load input which is coupled to the CaptureRequests__C control line 1602. The output of the Winners Register 1600 is coupled to the WinnersReq__Q bus 1604. A 1 and only 1 detector and all zeros detector 1606 and 1608 receive the WinnersReq__Q bus 1604. The outputs of these detectors are input to an OR gate 1605 having its output coupled to the CaptureRequests__C signal line 1602. The CaptureRequests__C signal line 1602 is also coupled to the Load input of the State__Q register 1460.

The WinnersReq__Q bus 1604 is also coupled to the input of a Combinatorial Priority Encoder 1700 which outputs the address of the left most one of the row held in the Winners Register 1600. The output of the Combinatorial Priority Encoder 1700 is the Port Grant bus 1704 which selects the input port winning the arbitration. The Port Grant bus 1704 is also coupled by the bit clear signal line 1706 to the bit clear input of the Winners Register 1600 to clear the leftmost one of the row held in the Winners Register 1600. Thus, the next leftmost bit is encoded and cleared until only bit is left set. At this point the CaptureReq 1602 signal is asserted to load the next row into the Winners Register 1600 and load the next counter value into the State__Q register 1460.

The operation of the system of FIG. 11 will now be described. This system has several features not performed by the system of FIG. 9 including a look-ahead function to skip rows that include all zeros and an a special unbiased cycle that guarantees that all requesting ports get serviced regardless of their bias values.

The AND gates 1440 and daisy chained OR gates 1452 and reversing circuit 1453 perform similar functions to those performed by the system of FIG. 9. The AND gates 1440 assure that columns of the Request Matrix are zero for non-requesting ports. The daisy-chained OR gates 1452 and reversing circuit 1453 generate the ForceOnes signal, which corresponds to CtrMask of FIG. 9, that causes the incrementers to skip all consecutive higher order all-zero rows of the transpose table.

Turning now to the look-ahead function, at a given time the State__Q register 1460 holds the counter value encoding the next row to be loaded into the Winners Register 1600. The output of the first incrementer 1462, which increments once the value held in the State__Q register 1460, encodes the row that will be loaded into the Winners Register 1600 after the next row, i.e., the next, next row, and the output of the second incrementer 1464, which increments the output of the first incrementer 1462, encodes the row that will loaded into the Winners Register 1600 after the next, next row, i.e., the next, next, next row.

Each row is ORed and inverted to form the RowsWithBitsSet signal 1450 which encodes a 1 for each row having all bits equal to 0 and encodes a 0 for each row having any bits equal to one. The counter includes the first and second incrementers 1462 and 1464. Ignoring the ForceOnes function for the moment, the State__Q register 1460 holds a counter value selecting the next row of the Request Matrix. The first and second row decoders 1472 and 1474 correspond to the RightMost function priority encoder 560 of FIG. 9 and identify the row of the Request Matrix. The first row decoder 1472, coupled to the output of the State__Q register 1460, identifies the next row to be selected and selects the bit of RowsWithBitsSet signal corresponding to the next row to be selected. The second row decoder 1474, coupled to the output of first incrementer 1462, identifies the next, next row to be selected. If the bit selected of the RowsWithBitsSet signal is 0, indicating that the row is not all zeros, then the output of the first decoder is selected by row-select MUX 1490 and the next row is transferred to the Winners Register 1600. If the bit selected of the RowsWithBitsSet signal is 1 then the output of the second decoder 1474 is selected by row-select MUX 1490 and the next, next row is transferred to the Winners Register 1600.

Thus, rows having all zeros will be skipped. Further, the bit selected from the RowsWithBitsSet signal also controls whether the output of the first or second incrementer 1462 or 1464 is transferred to the State__Q register 1460 through the look ahead MUX 1470. IF the bit is 0, row is not all zeros, then the singly incremented output of the first incrementer 1462 is selected to encode the next, next row. This is the row that follows the next row previously encoded by the first row decoder. IF the bit is 1, row is all zeros, the output of the first incrementer 1462, via the second decoder, has already been selected by the row-select MUX 1490. Thus, the output of the second incrementer 1464, which increments the value of the first incrementer 1462, is selected by the look-ahead MUX to be transferred to the State__Q register 1460.

Turning next to the special cycle, note that in the system of FIG. 9, no row is selected when the counter value is all 1's (See FIG. 7). In the system of FIG. 11, the selected rows of the trnaspose matrix and the PortReq signal are multiplexed by the NextWinners MUX 1502 under control of the SelRawReqs signal which is the OR of AllOnesState__C and ForceOnes==all 1's. The AllOnesState__C signal is asserted by the first row decoder 1472 when the value held in the State__Q register 1460 is all 1's. The assertion of the AllOnesState__C signal causes the PortReq signal to be loaded into the Winners Register so that each requesting port wins the arbitration regardless of its bias value (even if the bias value is set to zero) to assure that no requesting port ever hangs. FIG. 12 depicts the content of the Winners Register 1600 when the counter value is all 1's (equal to decimal 511) as being equal to the Request Vector. Setting ForceOnes to all 1's allows overriding the bias logic. That function might find use in temporarily selecting round-robin arbitration without reprogramming the bias values, or if some unanticipated defect in the implementation proved intolerable.

The use of the all 1's counter value to sample all the request inputs, regardless of their bias values, means that a bias value of zero still results in one arbitration each of the counter cycles. Thus the bias vectors actually encode effective biases of 1 to $2^{}N$ instead of the range 0 to $(2^{}N)-1$ of the embodiment of FIG. 9. This prevents possible failure if a requestor having a bias value of zero requests access to the port.

Also, the reset value for the bias values is zero, and for the counter is all 1's. Thus, resetting results in round robin arbitration without having to explicitly program the bias values.

In view of the above, it is apparent that an efficient biased arbitration scheme is implemented by a very simple hardware arrangement. Additionally, from a programmer's point of view, only the bias vectors need to be loaded into the bias registers 40. There is no need to explicitly consider the structure of the transpose table. Also, as depicted in FIG. 8, the access to the output port is evenly spaced over the arbitration period to avoid starvation of certain nodes.

The transpose table arbitration bias technique has been described in the context of router arbitration. However the technique has utility in other systems such as bus arbitration and in Virtual Interface (VI) Architecture.

In the context of bus arbitration, in a PCI system the transpose table technique is utilized to allow the BIOS to give any level of priority to any device. If every slot is assigned a bias number to assign the priority level for the slot, then arbitration priorities are guaranteed to be assigned in ratios of assigned bias values.

Figure 13:
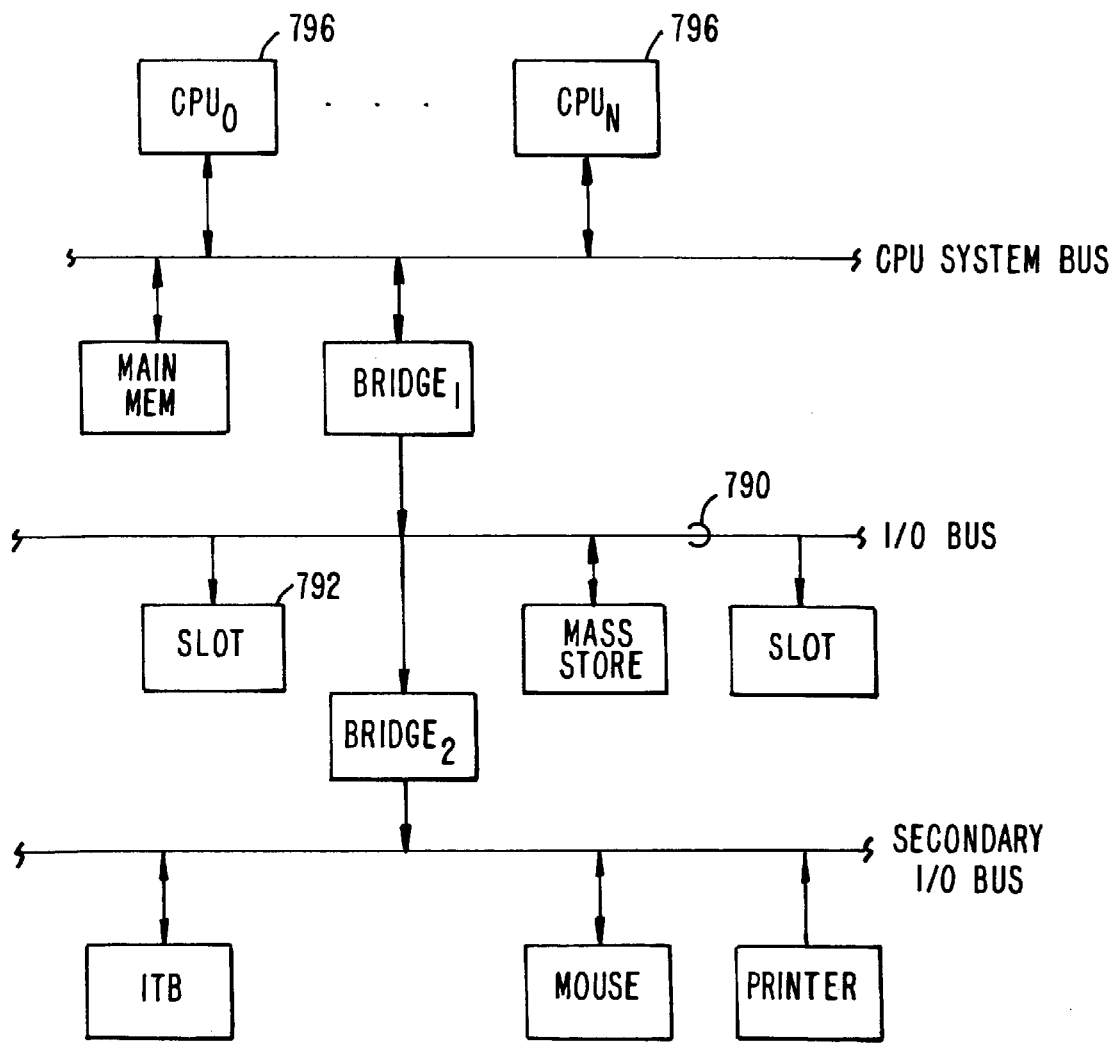
FIG. 13 is a schematic diagram of the bus structure of a processing system.

FIG. 13 depicts a computer system having an I/O bus 790 having a plurality of slots 792. The biased arbitration system is implemented in a bridge 794 where a different slot 792 could be requesting access to a particular shared resource such as a processor 796.

In the context of VI arbitration, each time a packet is sent the on-chip scheduler has to select one of the active VIs to service. In the transpose table approach, each row would logically have up to 16K bits (one per VI), and 4–8 rows to give 16–256 levels of service.

Figure 14:
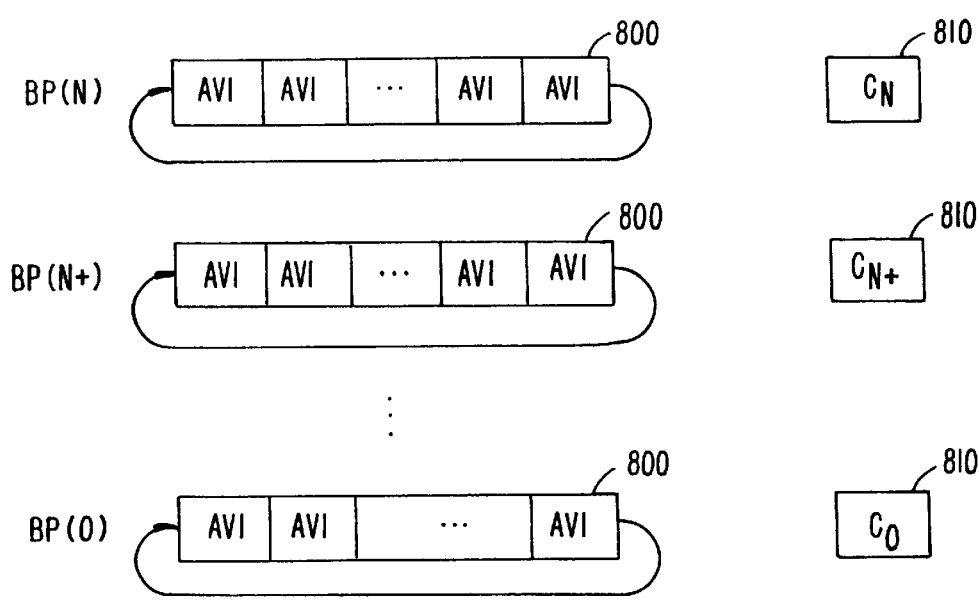
FIG. 14 is a schematic diagram of an alternative embodiment utilizing compression.

As is apparent from the above description, a large part of the table is utilized to store "0"s. For the VI arbitration technique the storage requirement can be reduced by compression. In one embodiment, a table is stored in local RAM as bit vectors or in a compressed form. One example of a compression technique is schematically illustrated in FIG. 14. A circular queue 800 of active VIs is utilized for each row (bit position in the binary bias vector). Each row of the table (bit position of binary bias value vector) also has a count value 810 of the number of active VIs with that bit on. To perform an arbitration, first a row with nonzero count is found, then all VIs in that row with bits on are serviced.

The invention has now been described with reference to the preferred embodiments. Alternatives and substitutions will now be apparent to persons of skill in the art. For example, although a twelve port router was described, the invention can be utilized in systems having fewer or more ports. Further, although the bias vectors are described having 9-bit precision, different precision levels can be utilized. Accordingly, it is not intended to limit the invention except as provided by the appended claims.

What is claimed is:

1. A system for biasing each of a plurality of requestors for participation in arbitration for data communication access to a shared resource, said system comprising:

a memory holding a plurality of binary bias vectors, with each binary bias vector corresponding to one of said requestors and having N binary digits, with each binary digit located in a binary location of the binary bias vector, with said binary bias vector encoding a bias value provided for a corresponding requestor, with each binary bias vector having a most significant bit positions being a highest order bit position of the binary bias vector, with said binary bias value vectors encoded so that a selected binary value indicates a desired access to said shared resource, and with the binary digits at a particular binary position in all the binary bias vectors being a row of a bias matrix, with higher order rows including binary digits in the more significant bit positions of the binary bias vectors and lower order rows including binary digits in less significant bit positions of the binary bias vectors;

a request signal bus for receiving and holding a request vector identifying which of said requestors have requests pending during an arbitration cycle;

a request masking circuit, coupled to a request register and a plurality of binary registers, for masking binary bias vectors of requestors not having requests pending to have no digits equal to said selected binary value, with the binary digits of masked binary bias vectors at a particular binary position being a request row in a request matrix;

a counter circuit comprising:
    a state register holding a next row value:
    a first incrementer, coupled to the output of the state register, having an output signal with a value equal to an incremented next row value;
    a second incrementer, coupled to the output of said first incrementer, having an output equal to a twice incremented next row value;

a first mapping circuit, coupled to said state register to receive said next row value, the first mapping circuit having an output providing a first mapping signal that maps sequential next row values to interleave frequent identification of higher order rows with infrequent identification of lower order rows;

a second mapping circuit, coupled to said first incrementer to receive said incremented next row value, the second mapping circuit having an output providing a second mapping signal that maps sequential incremented next row values to interleave frequent identification of higher order rows with infrequent identification of lower order rows, with said second mapping circuit identifying a request row that would be accessed by said first mapping circuit after the next row value held by said state register is incremented;

a row-selecting multiplexer having a first input coupled to the output of said first mapping circuit, a second input coupled to the output of said second mapping circuit, an output, and a control input coupled to receive a skip-row control signal, with the multiplexer connecting its first input to its output when the skip-row signal is not asserted and connecting its second input to its output when the skip-row signal is asserted, with assertion of the skip row signal indicating that a request row identified by said first mapping circuit consists of all zeros;

an incrementer-selecting multiplexer having a first input coupled to said first incrementer circuit, a second input coupled to said second incrementer circuit, an output coupled to said state register, and a control input coupled to receive said skip-row control signal, with the multiplexer connecting its first input to its output when the skip-row control signal is not asserted and connecting its second input to its output when the skip-row signal is asserted; and a request granting circuit, coupled to the output of said row-selecting multiplexer, for accessing a request row identified by the output of said row-selecting multiplexer and sequentially granting access to said shared resource to requestors having said selected binary value in an accessed request row.

2. The system of claim 1 further comprising:
a plurality of first logic circuits, each first logic circuit receiving all the binary digits of a corresponding bias row, with each first logic circuit having an output providing a skip-row signal which is asserted if each received binary digits is not equal to the selected binary value;
a row-skipping multiplexer, having a plurality of inputs, each input coupled to an output of a corresponding first logic circuit, an output coupled to the control inputs of said row-selecting and incrementer-selecting multiplexers, and a control input coupled to the output of said first mapping circuit.

3. The system of claim 2 wherein a logic circuit includes:
an OR gate, having inputs coupled to receive all the binary digits of a corresponding bias row and an output; and
an inverter having an input coupled to the output of the OR gate and an output for providing said skip-row signal.

4. The system of claim 2 further comprising:
a second logic circuit, including a plurality of daisy-chained OR gates and a signal reversing circuit, coupled to receive the outputs of said plurality of first logic circuits, having an output providing a ForceOnes signal for masking all consecutive most significant request rows having each binary digit not equal to the selected binary value;
a first OR gate, having inputs coupled to the output of said first incrementer and said second logic circuit and an output coupled to the first input of said incrementer-selecting multiplexer, for merging the output of the first incrementer and said ForceOnes signal; and
a second OR gate, having inputs coupled to the output of said second incrementer and said second logic circuit and an output coupled to the second input of said incrementer-selecting multiplexer, for merging the output of the second incrementer and said ForceOnes signal.

5. The system of claim 1 wherein, said first mapping circuit includes an output providing a control output signal asserted when all binary digits of said next row signal are equal to the selected binary value, with said request granting circuit comprising:
a next winners multiplexer, having a first input for receiving a selected request row, a second input for receiving said request vector, and an output for providing either the selected request row or the request vector, and a control input for receiving said control output signal, with the next winners multiplexer selecting said request vector as its output signal when said control output signal is asserted; and
a winners register coupled to the output of the next winners multiplexer.

6. A method for biasing each of a plurality of requestors for participation in arbitration for data communication access to a shared resource, said method comprising the steps of:
providing each of the plurality of requestors with a bias value, with each bias value having a value between 1 and 2N, with N being a predetermined integer;
forming a binary bias vector, having N binary digits, for each of said plurality of requestors, with each binary digit having a first or second binary value, with said binary bias vector encoding said bias value provided for a corresponding requester, with each binary bias vector having a most significant bit position being a highest order bit position of the binary bias vector and with said binary bias vectors encoded so that a binary digit equal to the first binary value indicates a desired access to said shared resource, and with the binary digits at a particular binary position in all the binary bias vectors being a row of a bias matrix, with higher order rows including binary digits in the more significant bit positions of the binary bias vectors and lower order rows including binary digits in less significant bit positions of the binary bias vectors;
receiving a request vector identifying which of said requestors have request pending during an arbitration cycle;
forcing the binary digits of all binary bias vectors for requestors not having requests pending to the second binary value to form request vectors and request rows corresponding to said binary bias vectors and said rows of the bias matrix;
incrementing a count value to select rows of a transposed table;
mapping said count value to map sequential next row values to interleave frequent identification of higher order request rows with infrequent identification of lower order request rows;
skipping request rows having each binary digit not equal to the first binary value to skip rows indicating no requests; and
sequentially granting access to said shared resource to requestors having binary digits equal to said first binary value in an accessed row.

7. The method of claim 6 further comprising the step of:
providing said request vector as a request row when said count value is a predetermined value.

8. A method for biasing each of a plurality of requestors for participation in arbitration for data communication access to a shared resource, said method comprising the steps of:
providing each of the plurality of requestors with a bias value, with each bias value having a value between 0 and (2**N)–1, with N being a predetermined integer;
forming a binary bias vector, having N binary digits, for each of said plurality of requestors, with said binary bias vector encoding said bias value provided for a corresponding requester, with each binary bias vector having a most significant bit position being a highest order bit position of the binary bias vector and with said binary bias vectors encoded so that a selected binary digit indicates a desired access to said shared resource, and with the binary digits at a particular binary position in all the binary bias vectors being a row of a bias matrix, with higher order rows including binary digits in the more significant bit positions of the binary bias vectors and lower order rows including binary digits in less significant bit positions of the binary bias vectors;
receiving a request vector identifying which of said requestors have requests pending during an arbitration cycle;
forcing all binary bias vectors for requestors not having requests pending to a value of zero to form request vectors and request rows corresponding to said binary bias vectors and said rows of the bias matrix;
incrementing a count value to select rows of a transposed table;
mapping said count value to map sequential next row values to interleave frequent identification of higher order request rows with infrequent identification of lower order request rows; and sequentially granting access to said shared resource to requestors having said selected binary digit in an accessed row.

9. A system for arbitrating access to a shared resource by a plurality of requestors, the system comprising:
  a memory configured to store a plurality of binary bias vectors wherein each binary bias vector corresponds to a respective one of the requestors and a selected binary value of the binary vector indicates a desired access to the shared resource;
  a masking circuit for masking the binary bias vectors such that the binary digits of the masked binary bias vectors at a particular binary position are a request row in a request matrix;
  a counter circuit configured to store a next row value, an incremented row value, and a twice incremented row value of the request matrix;
  a first mapping circuit configured to receive the next row value of the request matrix from the counter circuit and map sequential row values to interleave frequent identification of higher order rows with infrequent identification of lower order rows in order to generate a first mapping signal;
  a second mapping circuit configured to receive the incremented row value of the request matrix and identify the next request row accessed by the first mapping circuit and map sequential incremented row values to interleave frequent identification of higher order rows with infrequent identification of lower order rows in order to generate a second mapping signal, the second mapping circuit identifying the request row that would be accessed by the first mapping circuit after the next row value held by the counter is incremented;
  a row-selecting multiplexer configured to receive the first mapping signal and the second mapping signal, the row-selecting multiplexer configured to output the second mapping signal when a skip-row control signal indicates that the row is to be skipped and output the first mapping signal otherwise;
  an incrementer-selecting multiplexer configured to receive the incremented row value and the twice incremented row value and update the counter circuit to the incremented row value when the skip-row control signal indicates that a row is to be skipped; and
  a request granting circuit configured to grant access to the shared resource for requestors having the selected binary value of the binary bias vector in the request row identified by the row-selecting multiplexer.

10. The system of claim 9 wherein the counter comprises:
  a state register for storing the next row value;
  a first incrementer for storing the incremented next row value; and
  a second incrementer for storing the twice incremented next row value.

11. The system of claim 10 wherein the binary bias vector has N binary digits and the binary digits at a particular binary position being a row of a bias matrix with a most significant bit position being a highest order bit position such that higher order rows of the bias matrix include binary digits of the binary bias vector in the more significant bit positions of the binary bias vector and lower order rows including binary digits in less significant bit positions.

12. The system of claim 10 further comprising a request signal bus for receiving and storing a request vector identifying which of said requestors have requests pending during an arbitration cycle.

13. The system of claim 10 further comprising a request masking circuit for masking binary bias vectors of requestors not having requests pending to have no digits equal to the selected binary value.

14. A method for biasing arbitration of a shared resource between a plurality of requestors for data communication, the method comprising the steps of:
  assigning each requestor a bias value;
  encoding a binary bias vector for each requestor with the bias value indicating a desired access to the shared resource with the binary digits of the binary bias vector at a particularly binary position being a row of a request matrix;
  incrementing a count value to select rows of the request matrix;
  mapping the count value to map sequential next row values to interleave frequent identification of higher order request rows with infrequent identification of lower order request rows;
  skipping request rows indicating that no request is pending; and
  sequentially granting access to the shared resource for requestors having the selected binary value of the binary bias vector in a request row of the request matrix.

15. The method of claim 14 wherein the each bias value has a value between 1 and 2N with N being a predetermined integer and the binary bias vector is encoded with N binary digits.

16. The method of claim 15 wherein the binary bias vector is encoded with a most significant bit position being a highest order bit position.

17. The method of claim 16 wherein binary digits at a particular binary position in all the binarry bias vectorors are rows of the the bias matrix with higher order rows including binary digits in the more significant bit positions of the binary bias vectors and lower order rows including binary digits in less significant bit positions.

18. The method of claim 17 further comprising the step of receiving a request vector identifying which of the requestors have a request pending during an arbitration cycle prior to incrementing the count value.

* * * * *